US 9,695,928 B2

(12) United States Patent
Ashimori et al.

(10) Patent No.: US 9,695,928 B2
(45) Date of Patent: Jul. 4, 2017

(54) TRANSMISSION LUBRICATION SYSTEM

(71) Applicant: HONDA MOTOR CO., LTD., Tokyo (JP)

(72) Inventors: Takashi Ashimori, Tokyo (JP); Yuuichi Hidaka, Wako (JP); Akio Muto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 14/645,016

(22) Filed: Mar. 11, 2015

(65) Prior Publication Data

US 2015/0260273 A1  Sep. 17, 2015

(30) Foreign Application Priority Data

Mar. 12, 2014 (JP) .................................. 2014-049476

(51) Int. Cl.
*F16H 37/06* (2006.01)
*F16H 57/04* (2010.01)

(52) U.S. Cl.
CPC ..... *F16H 57/0435* (2013.01); *F16H 57/0417* (2013.01); *F16H 57/0421* (2013.01);
(Continued)

(58) Field of Classification Search
CPC .................................. F16H 39/00; F16H 3/00
(Continued)

(56) References Cited

U.S. PATENT DOCUMENTS 5,222,418 A * 6/1993 Murota ............... F16H 57/0434
184/6.12
7,582,042 B2 * 9/2009 Sato .................... F16H 61/0021
192/3.29
(Continued)

FOREIGN PATENT DOCUMENTS

CN  101611246 A  12/2009
CN  102216649 A  10/2011
(Continued)

OTHER PUBLICATIONS

Office Action dated Dec. 6, 2016, issued in counterpart Japanese Patent Application No. 2014-049476, with English translation. (5 pages).
Office Action dated Dec. 29, 2016, issued in counterpart Chinese Application No. 201510098647.7, with English translation (16 pages).

*Primary Examiner* — Ha D Ho
(74) *Attorney, Agent, or Firm* — Westerman, Hattori, Daniels & Adrian, LLP (57) ABSTRACT

The system comprises an oil pump driven in conjunction with an output shaft of a transmission, a first oil path for supplying oil discharged from the oil pump to a lubrication system of the transmission, a second oil path arranged in parallel with the first oil path to guide the oil from the oil pump to a heat exchanger, and a valve inserted on an upstream side of the heat exchanger in the second oil path. The valve opens at a first set pressure to conduct the oil from the oil pump to the second oil path. The oil is supplied to the first oil path in a low vehicle speed area below the first set pressure, so that oil supply necessary for the lubrication system can be ensured. The oil is supplied to the second oil path in a high vehicle speed area over the first set pressure.

4 Claims, 5 Drawing Sheets

(52) U.S. Cl.
    CPC ..... *F16H 57/0442* (2013.01); *F16H 57/0445* (2013.01); *Y10T 74/19219* (2015.01); *Y10T 74/19991* (2015.01)

(58) Field of Classification Search
    USPC ........................................ 74/325, 335, 732.1
    See application file for complete search history.

(56) References Cited

U.S. PATENT DOCUMENTS

| | | | |
|---|---|---|---|
| 8,910,763 B2* | 12/2014 | Mitsui | F16H 61/14 192/3.29 |
| 2003/0083169 A1* | 5/2003 | Iwata | F16H 61/12 475/208 |
| 2008/0051251 A1 | 2/2008 | Ogata et al. | |
| 2008/0256943 A1 | 10/2008 | Shimizu et al. | |
| 2010/0181159 A1* | 7/2010 | Shimizu | F16H 61/0031 192/85.63 |
| 2011/0203409 A1 | 8/2011 | Nishida et al. | |

FOREIGN PATENT DOCUMENTS

| | | |
|---|---|---|
| JP | 2001-280341 A | 10/2001 |
| JP | 2008-267444 A | 11/2008 |
| JP | 4179364 B2 | 11/2008 |
| JP | 2012-87822 A | 5/2012 |

* cited by examiner

TRANSMISSION LUBRICATION SYSTEM

TECHNICAL FIELD

The present invention relates to a transmission lubrication system to supply and to cool lubricant for a transmission in conjunction with a change of vehicle speed.

BACKGROUND ART

A conventional lubricant supplying system for a transmission of a vehicle, such as shown in Japanese Patent No. 4179364 corresponding to U.S. Patent Application Publication No. 2008/051251 for example, is configured to use surplus of working fluid as a lubricant source, and to supply the oil from the lubricant source to a lubrication system such as gears, after having been cooled down via an air-cooled type cooler. That is, the cooler and the lubrication system are arranged in series with the lubricant source. Also, a safety valve is provided on an upstream side of the cooler in an oil path. A pressure value to open this safety valve is set to a value such that the safety valve will not be opened in an operating state of a lock up clutch which is a supply destination of working fluid, and such that the safety valve will be opened in an off state of the lock up clutch so that supply of oil to the cooler would not be exceed.

In the conventional lubricant supplying system such as described above, there is an inconvenience that, when the oil was stopped up within the cooler, or when a pressure drop in the cooler is increased in case of a low oil temperature, the safety valve is opened, so that lubricant is not sufficiently supplied to the lubrication system such as gears. Further, because the surplus of working fluid is used as the lubricant source, it is needed to increase the size of the oil pump so that the surplus of working fluid can be occurred constantly during low-speed rotation or the like, in order to ensure a volume of lubrication.

SUMMARY OF INVENTION

In view of the foregoing prior art problems, it is a primary object of the present invention to provide a transmission lubrication system which can ensure a required supply of lubricant for a lubrication system regardless of a state of a cooler, and can reduce the size of an oil pump as small as possible.

A transmission lubrication system according to the present invention comprises an oil pump (41) that is driven in conjunction with an output shaft (30) of a transmission (20); a first oil path (43) configured to supply oil discharged from the oil pump to a lubrication system (45, 32, 33) of the transmission; second oil path (44) arranged in parallel with the first oil path in order to guide the oil from the oil pump to a heat exchanger (48); and a first valve (46) inserted, on an upstream side of the heat exchanger, in the second oil path, the first valve configured to open at a first set pressure to conduct the oil from the oil pump to the second oil path. Note that reference numerals of corresponding constituent elements in later described embodiments are represented in parenthesis above and below, for a referential purpose only.

According to the present invention, because the first oil path (43) for supplying oil to the lubrication system and the second oil path (44) for guiding the oil to a heat exchanger are arranged in parallel with each other, it is possible to ensure a sufficient supply of lubricant to the lubrication system regardless of a state of the heat exchanger (cooler). In addition, because the transmission lubrication system is constructed to supply directly the oil discharged from the oil pump to the lubrication system via the first oil path, there is no need to enlarge the size of the oil pump taking account of surplus of working fluid occurred during low-speed rotation or the like as the aforementioned conventional technique, thus the size of the oil pump can be downsized relatively. In addition, because the second oil path is constructed to be opened at the first set pressure of the first valve, while the volume of oil corresponding to the vehicle speed can be ensured from the oil pump driven in conjunction with the output shaft of the transmission, it is possible to perform properly the distribution of oil to the first oil path (the lubrication system) and the second oil path (the heat exchanger) by setting of the first set pressure. Thus it is possible to perform properly the supply of oil to both the lubrication system and the heat exchanger (the cooler), using the pump with relatively small size. As the oil is exclusively supplied only to the first oil path (the lubrication system) in a low vehicle speed area which is lower than a predetermined vehicle speed (20 km/h for example) corresponding to the first set pressure, it is possible to ensure the required supply of oil to the lubrication system even in the low vehicle speed area. Further, because the oil is supplied to the second oil path (the heat exchanger) in a high vehicle speed area which is equal to or higher than the predetermined vehicle speed corresponding to the first set pressure and in which the oil cooling is needed, it is possible to ensure the required oil cooling. Moreover, by such the oil distribution corresponding to vehicle speed (the pressure of oil pump), the oil distribution can be performed efficiently, and thus it is possible to use an oil pump with relatively small size, which results in saving the space and the cost.

BRIEF DESCRIPTION OF DRAWINGS

Certain preferred embodiments of the present invention will hereinafter be described in detail, by way of example only, with reference to the accompanying drawings, in which.

DETAILED DESCRIPTION

Figure 1:
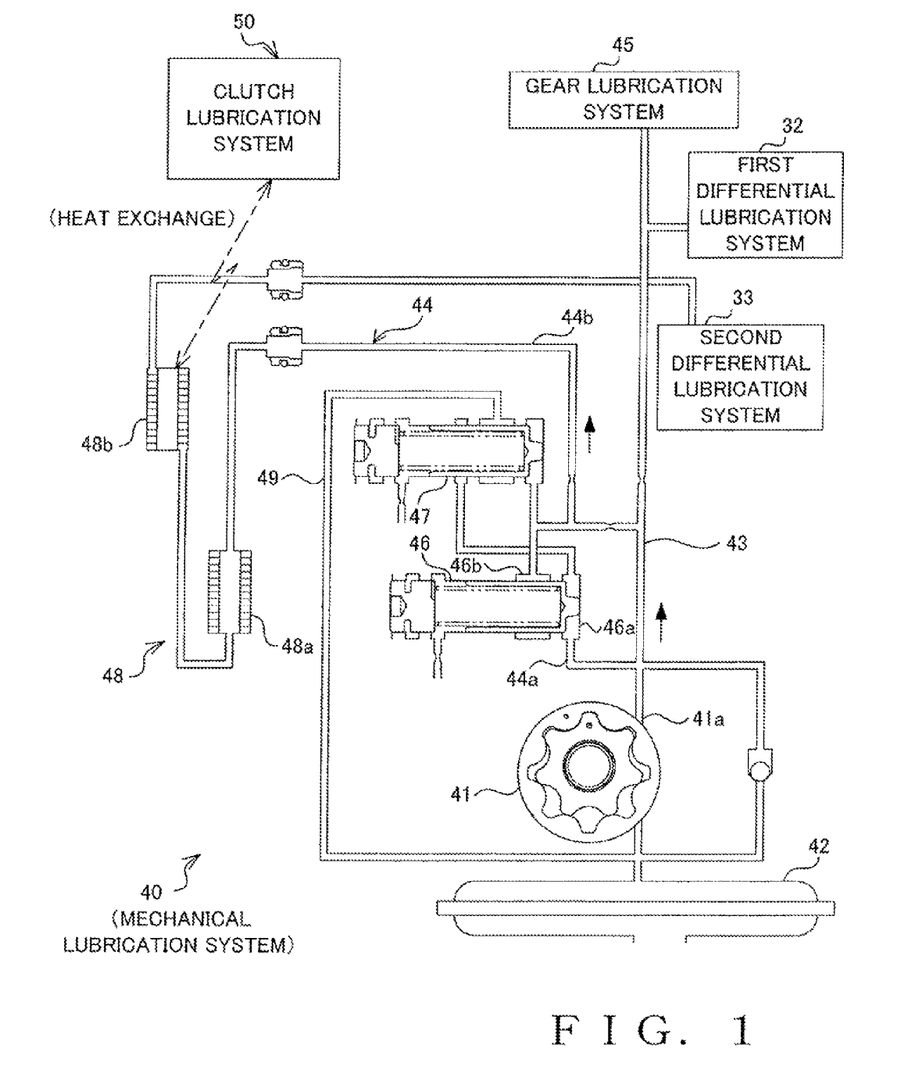
FIG. 1 illustrates an oil-hydraulic circuit diagram according to an embodiment of the present invention.
Figure 2:
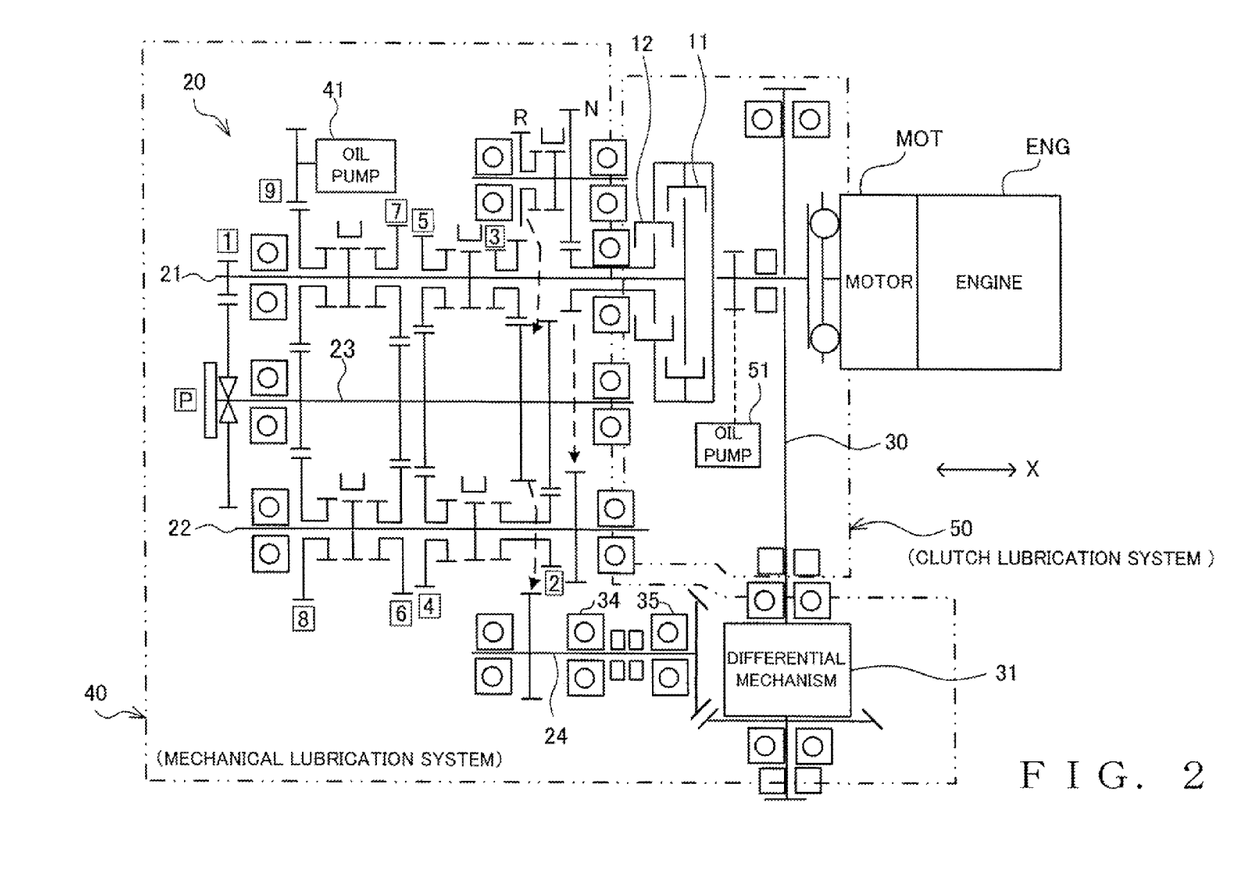
FIG. 2 illustrates a skeleton diagram showing a driving force-transmitting mechanism to which the transmission lubrication system according to an embodiment of the present invention applies.

FIG. 1 illustrates an oil-hydraulic circuit diagram according to an embodiment of the present invention. FIG. 2 illustrates a skeleton diagram showing a driving force-transmitting mechanism to which the transmission lubrication system according to an embodiment of the present invention applies. First of all, referring FIG. 2, the driving force-transmitting mechanism will be explained.

In FIG. 2, an engine of this vehicle is a type of hybrid engine comprising an internal-combustion engine ENG and an electric motor generator MOT. A transmission 20 consists of a 9-speed dual clutch transmission, being constructed so that a main shaft 21 which is an input shaft for even-numbered gears, and a secondary shaft 22 which is an input shaft for odd-numbered gears, are disposed in parallel each other, and along a moving direction X of the vehicle. The drive force from the engine (EMG and MOT) is transferred to the main shaft 21 via a first clutch 11, and then to the secondary shaft 22 via a second clutch 12. On the main shaft 21, the $1^{st}$ gear 1 is fixed thereon so as to rotate integrally with the main shaft 21, while each of the $3^{rd}$ gear 3, the $5^{th}$ gear 5, the $7^{th}$ gear 7, and the $9^{th}$ gear 9 (i.e., movable gears) are provided on the main shaft 21 in such a manner as to be selectable whether the movable gears 3, 5, 7 and 9 rotate along with the main shaft 21 or rotate relatively to the main shaft 21. Also on the secondary shaft 22, each of the $2^{nd}$ gear 2, the $4^{th}$ gear 4, the $6^{th}$ gear 6, and the $8^{th}$ gear 8 (i.e., movable gears) are provided thereon in such a manner as to be selectable whether the movable gears 2, 4, 6 and 8 rotate along with the secondary shaft 22 or rotate relatively to the secondary shaft 22. Yet, reverse gear (movable gear) R is provided on the secondary shaft 22 in a selectable manner so as to rotate along with or relatively to the secondary shaft 22, so that the drive force is transferred in reverse from the secondary shaft 22. As is known, the selection of each of gears (movable gears) 2-9 and R are done by a corresponding synchronizer mechanism, and only one or more movable gears corresponding to a selected gear position are connected to the input shaft (the main shaft 21 or the secondary shaft 22) and is rotated along with the input shaft. Other movable gears corresponding to gear positions other than the selected gear position are rotated relatively (i.e., idle away) to the rotation of the input shaft (the main shaft 21 or the secondary shaft 22).

A counter shaft 23 is disposed in parallel with the input shaft (the main shaft 21 or the secondary shaft 22), while a plurality of fixed gears provided so as to rotate integrally with the counter shaft 23 are engaged with the each of gears (movable gears) 2-9 and R of the input shaft (the main shaft 21 or the secondary shaft 22). A driving output shaft 24 is disposed in parallel with the counter shaft 23 and engaged with the counter shaft 23 via one of the fixed gears so as to rotate integrally with the counter shaft 23. The driving output shaft 24 is coupled, via a differential mechanism 31, with an output shaft 30 disposed perpendicular to the driving output shaft 24. As is well known, wheels (not shown in the figure) are fixed on the both ends of the output shaft 30. In this disclosure, the counter shaft 23 and the driving output shaft 24 are also referred as an intermediate shaft. Fixed gears and movable gears for gear-shifting provided on the input shaft (i.e., the main shaft 21 or the secondary shaft 22) and the counter shaft 23 are collectively referred as a gear-changing mechanism constructed to change gears between the input shaft and the intermediate shaft, in this disclosure.

In this embodiment, a lubrication system of the transmission 20 comprises two systems; one of them is a mechanical lubrication system 40, and the other one is a clutch lubrication system 50. The mechanical lubrication system 40 performs lubrication to the whole mechanism such as the input shaft, the gear-changing mechanism, the intermediate shaft, and the differential mechanism 31 in the transmission 20. The clutch lubrication system 50 performs lubrication to the mechanism related to the dual clutches 11 and 12. For each lubrication systems 40 and 50, oil pumps 41 and 51 are provided. The transmission lubrication system according to this invention is described as the mechanical lubrication system 40. The oil pump 41 for this mechanical lubrication system 40 is constructed so as to be driven together with rotation of the $9^{th}$ gear 9. Because the $9^{th}$ gear 9 rotates continuously together with rotation of the counter shaft 23, and the rotation of the counter shaft 23 is transferred continuously to the output shaft 30, the oil pump 41 is driven together with the output shaft 30 of the transmission 20, thus the oil pump 41 discharges the oil at the rotation frequency corresponding to vehicle speed.

FIG. 1 shows a detailed example of the mechanical lubrication system 40 which is an example of the transmission lubrication system according to this invention. In FIG. 1, the detailed description of the clutch lubrication system 50 is omitted. The oil pump 41 absorbs the oil collected at an oil pan 42 and discharges it to a first oil path 43. The first oil path 43 supplies lubricant to a gear lubrication system 45 and a first differential lubrication system 32 (namely, a first supply destination). The gear lubrication system 45 is a system for supplying lubricant to the input shaft, the gear-changing mechanism, and the intermediate shaft in the transmission 20. The first differential lubrication system 32 is a system for supplying lubricant to the gears and the rotating shafts of the differential mechanism 31. A second oil path 44 arranged in parallel with the first oil path 43 includes an oil path 44a communicating with a discharge slot 41a and an oil path 44b connecting to the oil path 44a via a relief valve (namely, a first valve) 46. At the oil path 44b located on a downstream side of the second oil path 44b, there are provided a heat exchanger 48 having an air cooling type oil-cooler 48a provided at its upstream side and oil-warmer 48b provided at its downstream side. The oil-cooler 48a cools the lubricant passing through the second oil path 44b. The oil-warmer 48b is constructed to perform heat exchange for cooling (drawing heat from) the lubricant in the clutch lubrication system 50. That is, the lubricant in the mechanical lubrication system 40, having been cooled by the oil-cooler 48a, is warmed by heat exchange with the hot lubricant in the clutch lubrication system 50. Hence, it is possible to cool effectively the lubricant in the clutch lubrication system 50, having been heated in accordance with the engagement of the clutches 11 and 12. The downstream end of the second oil path 44 leads to a second differential gear lubrication system 33 (namely, a second supply destination). As described below, the second differential gear lubrication system 33 is constructed to supply lubricant to a pair of tapered roller bearings 34 and 35 which pivotally support the driving output shaft 24. Note that the clutch lubrication system 50 itself may also have an oil-cooler, and if so, the size of the oil-cooler of the clutch lubrication system 50 can be downsized the result of the cooling support by the oil-warmer 48b of the mechanical lubrication system 40.

The relief valve (i.e., the first valve) 46 that is inserted at an upstream side of the heat exchanger 48 within the second oil path 44 functions so as to open at a first set pressure and conduct the oil from the oil pump 41 to the second oil path 44. That is, when the pressure of the oil discharged from the oil pump 41 is lower than the first set pressure (i.e., during the driving in a predetermined slow vehicle speed area), the relief valve (the first valve) 46 is closed, thus the oil is not supplied to the second oil path 44. When the pressure of the oil discharged from the oil pump 41 is equal to or higher than the first set pressure, the relief valve (the first valve) 46 is opened, thus the oil from oil pump 41 is supplied to the second oil path 44. As described below, the first set pressure is set properly so that the distribution of oil to the first oil path 43 (i.e., the lubrication systems 45 and 32) and the second oil path 44 (i.e., the heat exchanger 48) can be performed properly.

In the second oil path 44, a check valve (namely, a second valve) 47 is provided on the upstream side of the heat exchanger 48 and the downstream side of the relief valve (the first valve) 46 (namely, between the heat exchanger 48 and the relief valve 46). This check valve (namely, a second valve) 47 opens at a predetermined second set pressure higher than the first set pressure, and relieves the surplus oil of the second oil path 44 to a third oil path 49. The oil in the third oil path 49 is discharged to the oil pan 42. This check valve (the second valve) 47 functions to protect the heat exchanger by keeping the oil pressure from rising to above a predetermined high pressure.

Next, the setting concept of the first set pressure, i.e., the concept for controlling the distribution of oil to the first oil path 43 (the lubrication systems 45 and 32) and the second oil path 44 (the heat exchanger 48) will be explained hereinafter.

Figure 3:
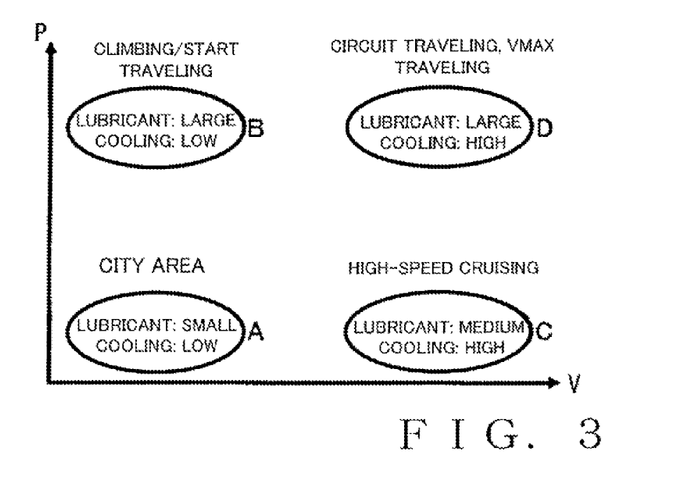
FIG. 3 is a conceptual diagram showing whole concept of the lubricating and the cooling in general in accordance with a vehicle traveling state.

First, the whole concept of the lubrication and the cooling in general in accordance with a vehicle traveling state will be explained with reference to FIG. 3. In FIG. 3, the horizontal axis "V" represents vehicle speed or differential rotational speed, and the vertical axis "P" represents contact pressure or torque. In the area A in which the both values of "V" and "P" are low in such case of the traveling slowly in a city area, for example, a required volume of lubricant is small and cooling power is also low. In the area B in which the value of "V" is low but the value of "P" is high in such case of the climbing or the start traveling, for example, a required volume of lubricant is large but cooling power is low. In the area C in which the value of "V" is high but the value of "P" is low in such case of the high-speed cruising, for example, a required volume of lubricant is middle but cooling power is low. In the area D in which the both value of "V" and "P" are high in such case of the circuit traveling or the maximum-speed (Vmax) traveling, for example, a required volume of lubricant is large and it is required that cooling power is also high.

As it is understood from the discussions above, lubricating performance is important in the area in which the value of "P" is high (namely, a high torque area), while cooling performance is important in the area in which the value of "V" is high (namely, a high vehicle speed area). As the area in which the value of "P" is high exists not only in a high vehicle speed area (D) but also in a low vehicle speed area (B), the volume of lubricant should be ensured properly in any vehicle speed area. That is, the volume of lubricant is required a proper volume even in the low vehicle speed area to prevent the mechanical system from damaging and seizing due to overheat. In contrast, the required volume of flowing oil to be cooled corresponds to the vehicle speed, but it is not important in the low vehicle speed area. Thus, it is conceivable that a hydraulic system separating the lubrication system and the cooling system is optimum. In view of this point, in the present invention, the oil discharged from the oil pump 41 is distributed in parallel to two systems including the first oil path 43 to supply oil to the lubrication system and the second oil path 44 to supply oil to the cooling system (the heat exchanger 48).

Figure 4:
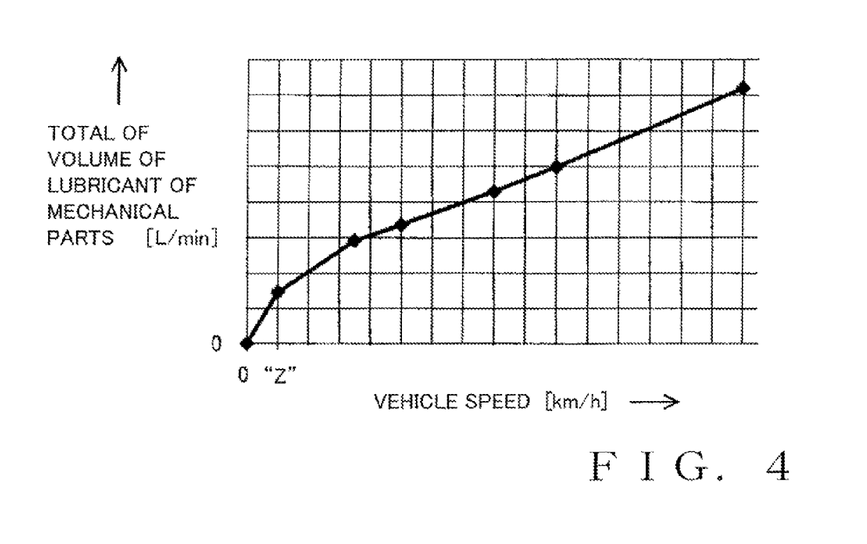
FIG. 4 is a graph showing an example of a characteristic of the total volume of lubrication to a mechanical lubrication system (a vertical axis) for vehicle speed (a horizontal axis) according to an embodiment of the present invention.

The first set pressure of the relief valve (the first valve) 46 is set in such a manner that a volume of lubricant necessary for an area of a low value of "V" and a high value of "P" like an area B shown in FIG. 3 is ensured and that cooling of lubricant is properly started. That is, the first set pressure is set to a value corresponding to the value of the discharge pressure of the oil pump 41 at a predetermined vehicle speed ("Z" km/h in FIGS. 4-6), so that the volume of lubricant rises to the required volume before the vehicle speed rises to the predetermined vehicle speed in a low vehicle speed area in which cooling is not necessarily required. In this case, an example of a characteristic of a total volume (a vertical axis) of lubrication in a mechanical lubrication system versus a vehicle speed (a horizontal axis) is as shown in FIG. 4. That is, in the low vehicle speed area where the vehicle travels from a start speed to the predetermined vehicle speed ("Z" km/h) corresponding to the first set pressure, a gradient representing the change of the total flow of lubricant is steep, thus the required volume of lubricant is ensured quickly. Regarding this point, the following explains an action of the system shown in FIG. 1. When the vehicle travels in an low speed area below the predetermined low vehicle speed (i.e., "Z" km/h) corresponding to the first set pressure, the relief valve (the first valve) 46 is closed, so that the oil discharged from oil pump 41 passes through only the first oil path 43 and it is supplied to the gear lubrication system 45 and the first differential lubrication system 32. In this way, because the oil does not circulate for cooling, it is possible to ensure the required volume of lubricant in the area in which the value of "V" is low and the value of "P" is high, such as the area B in FIG. 3, even though the oil pump 41 has only a low capacity.

Figure 5:
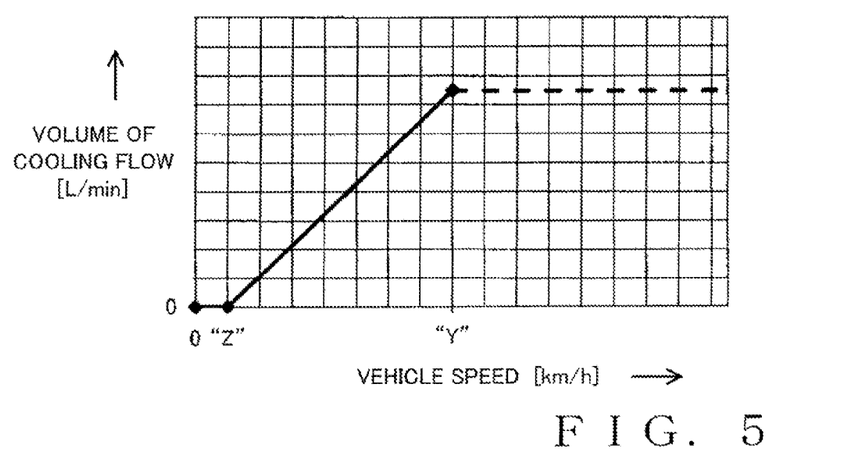
FIG. 5 is a graph showing an example of a characteristic of the volume of cooler oil (a vertical axis) for vehicle speed (a horizontal axis) according to an embodiment of the present invention.

In FIG. 1, if the oil pressure discharged from the oil pump 41 exceeds the first set pressure because of an increase in the vehicle speed, the relief valve (i.e., the first valve) 46 is opened, and then the oil path 44a leads to the oil path 44b, so that surplus oil flows to the second oil path 44 and it is cooled by cooler 48a. Of course, at the same time, supply of oil to the lubrication system via the first oil path 43 is maintained. An example of a characteristic of the volume of oil (a vertical axis) flowed to the cooler 48a versus the vehicle speed (a horizontal axis) is such a characteristic as shown in FIG. 5. That is, while the vehicle travels in the low vehicle speed area below the predetermined vehicle speed (i.e., "Z" km/h) corresponding to the first set pressure, the oil cooling by the cooler 48a does not carried out because the oil does not flow to the second oil path 44. In such the low vehicle speed area, the lubricant is not heated so much, so that it is allowed the oil cooling not to be carried out. In other words, in the low vehicle speed area in which it is allowed the oil cooling not to be carried out, the first set pressure of the relief valve (the first valve) 46 is set so that the oil does not flow to the second oil path 44. Note that in FIG. 5, the broken line shows a state that the check valve (i.e., the second valve) 47 is opened. The second set pressure for the check valve (the second valve) 47 is set to a value corresponding to another predetermined speed (e.g., "Y" km/h as shown in FIG. 5) considerably higher than the predetermined speed ("Z" km/h) for the first set pressure.

Figure 6:
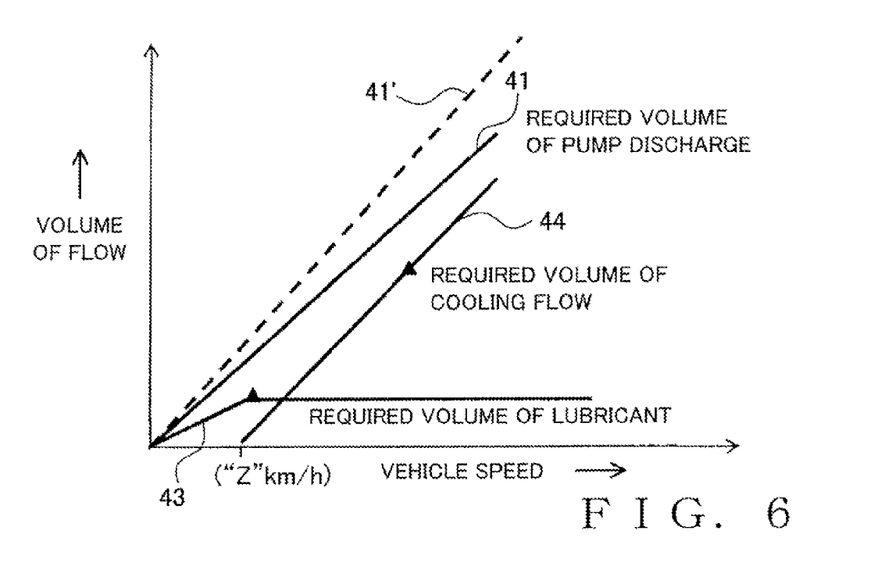
FIG. 6 is a graph illustrating a required volume of discharged oil from the oil pump according to an embodiment of the present invention.

FIG. 6 shows a graph illustrating a required volume of discharged oil from the oil pump 41 according to the present invention. In FIG. 6, a solid line 43 shows the flow of oil to be supplied to the lubrication system via the first oil path 43 (the required volume of lubricant). A solid line 44 shows the flow of oil to be supplied to the heat exchanger 48 via the second oil path 44 (the required cooling flow). According to the total volume of the required flow shown by the lines 43 and 44, a required volume of oil to be discharged from the oil pump 41 is determined as shown by a solid line 41. A gradient of the required volume of oil to be discharged from the oil pump 41 shown by the solid line 41 corresponds to a capacity (size) of the oil pump 41. As aforementioned, it only needs to take account of the required volume of the lubricant in the low vehicle-speed area below the predetermined vehicle speed ("Z" km/h), and it only needs to take account of the required volume of the cooling flow corresponding to the vehicle speed and a constant required volume of the lubricant in the high vehicle speed area over the predetermined vehicle speed ("Z" km/h). That is, according to the present invention, because it only needs to take account of the required volume of the lubricant (the first oil path 43) and the required volume of the cooling flow (the second oil path 44) independently from each other, the required volume of oil to be discharged from the oil pump 41 decreases relatively, thus the size of the pump can be downsized. In FIG. 6, a broken line 41' shows an example of the required volume of oil to be discharged from the oil pump 41 if the first oil path of the lubrication system and the second oil path of the heat exchange system are arranged in parallel without the relief valve (the first valve) 46, for reference. In such case, because the required volume of oil to be discharged from the oil pump 41 is determined so that the total of the volume of the lubricant and the volume of the cooling flow corresponding to the vehicle speed can be ensured in any vehicle speed areas, the required volume of oil to be discharged from the oil pump 41 increases relatively, thus the size of the pump can not be downsized. Thus, it can be understood that to provide the relief valve (the first valve) 46 is favorable to downsizing the size of the oil pump 41.

Figure 7:
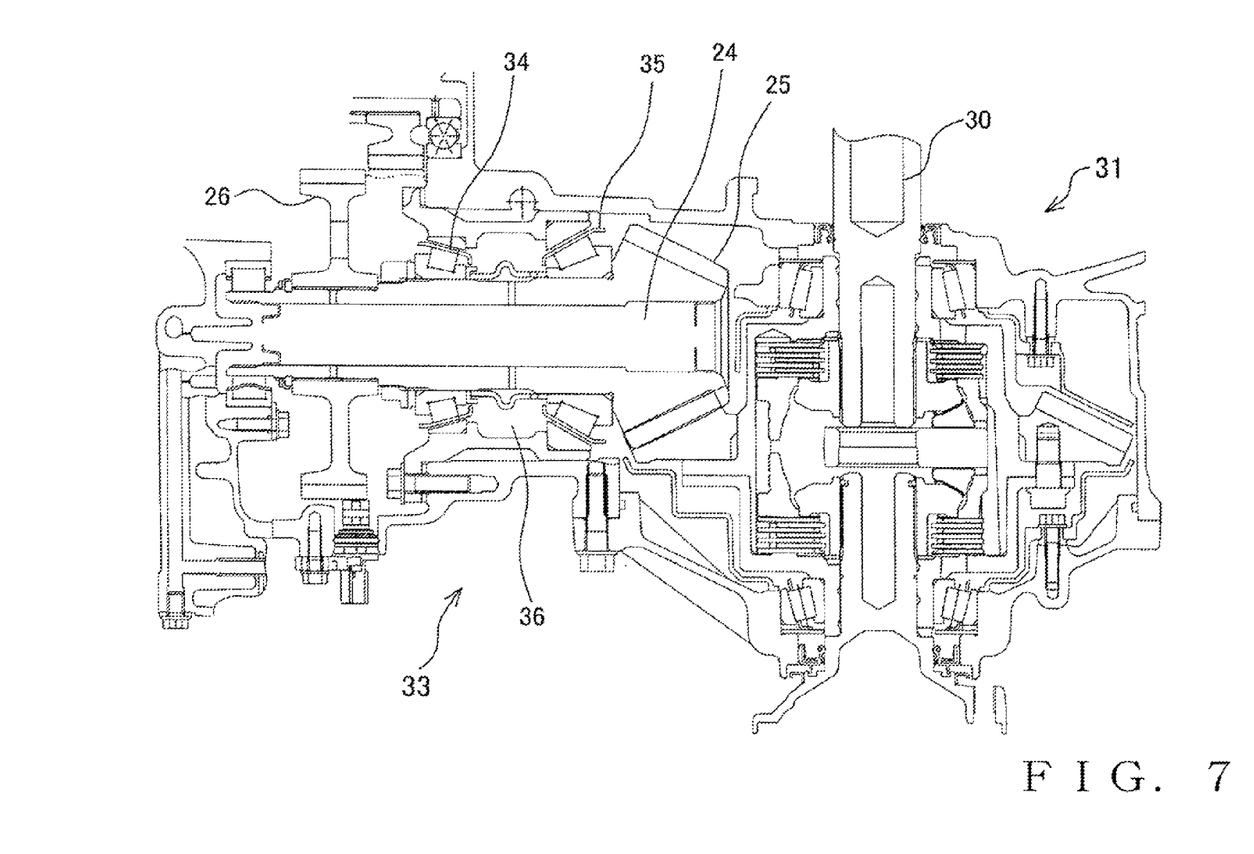
FIG. 7 illustrates a cross section diagram showing the construction to supply lubricant to a pair of tapered roller bearings pivotally supporting a driving output shaft, as an example of a second differential gear lubrication system (a second supply destination) at a downstream end of the second oil path.

FIG. 7 illustrates a cross section diagram showing the construction to supply lubricant to a pair of tapered roller bearings 34 and 35 pivotally supporting a driving output shaft 24, as an example of a second differential gear lubrication system 33 (a second supply destination) at a downstream end of the second oil path 44. The driving output shaft 24 of the transmission is pivotally supported by the pair of tapered roller bearings 34 and 35 and connected to a differential mechanism 31 via a hypoid pinion 25 provided on an end of the driving output shaft 24 as is known in the art. Also, on the other end of the driving output shaft 24, a fixed gear 26 is provided for engaging with the one of the fixed gears on the counter shaft 23. An outlet of the second oil path 24 opens at a space 36 between the pair of tapered roller bearings 34 and 35 (at the small-diameter sides of the tapered rollers), so that the oil having been passed through the heat exchanger 48 is discharged to the space 36 from the outlet. In accordance with rotation of the driving output shaft 24, the oil discharged to the space 36 is automatically scraped away to outside (the large-diameter side of the tapered roller) along the tapered side of the tapered roller bearings 34 and 35 and then further splashed by a centrifugal force, so that peripheral mechanisms (such as the hypoid pinion 25, and the fixed gears etc.) are lubricated. Thus it is possible to lubricate efficiently not only the tapered roller bearings 34 and 35 located at a discharged point for lubricant but also the peripheral mechanisms around them.

This application is based on, and claims priority to, JP PA 2014-049476 filed on 12 Mar. 2014. The disclosure of the priority application, in its entirety, including the drawings, claims, and the specification thereof, are incorporated herein by reference.

What is claimed is:

1. A transmission lubrication system comprising:
an oil pump that is driven in conjunction with an output shaft of a transmission;
a first oil path configured to supply oil discharged from the oil pump to a lubrication system of the transmission;
a second oil path arranged in parallel with the first oil path in order to guide the oil from the oil pump to a heat exchanger;
a first valve inserted, on an upstream side of the heat exchanger, in the second oil path, the first valve configured to open at a first set pressure to conduct the oil from the oil pump to the second oil path; and
a second valve arranged on the upstream side of the heat exchanger and a downstream side of the first valve in the second oil path, the second valve configured to open at a second set pressure, which is higher than the first set pressure, to relieve surplus oil of the second oil path to a third oil path, wherein the third oil path is constructed to lead a suction slot of the oil pump.

2. A transmission lubrication system comprising:
an oil pump that is driven in conjunction with an output shaft of a transmission;
a first oil path configured to supply oil discharged from the oil pump to a lubrication system of the transmission;
a second oil path arranged in parallel with the first oil path in order to guide the oil from the oil pump to a heat exchanger; and
a first valve inserted, on an upstream side of the heat exchanger, in the second oil path, the first valve configured to open at a first set pressure to conduct the oil from the oil pump to the second oil path, wherein
the oil of the first oil path is supplied to a first supply destination in the lubrication system of the transmission,
the oil of the second oil path is supplied to a second supply destination different from the first supply destination in the lubrication system of the transmission,
the transmission includes an input shaft that is disposed in a direction perpendicular to an axis of the output shaft,
the transmission further includes an intermediate shaft disposed in parallel with the input shaft and a gear-changing mechanism constructed to change gears between the input shaft and the intermediate shaft so that output torque of the intermediate shaft is transmitted to the output shaft,
the intermediate shaft is supported by a pair of tapered roller bearings, and
the second supply destination is a space between the pair of tapered roller bearings.

3. The transmission lubrication system as claimed in claim 2, wherein
the gear-changing mechanism includes a fixed gear configured to rotate along with the intermediate shaft and a movable gear which is engaged with the fixed gear and selectable so as to rotate along with the input shaft or to rotate relatively to the input shaft, and
the oil pump is disposed to be driven in conjunction with the movable gear or the fixed gear.

4. A transmission lubrication system comprising:
an oil pump that is driven in conjunction with an output shaft of a transmission;
a first oil path configured to supply oil discharged from the oil pump to a lubrication system of the transmission;

a second oil path arranged in parallel with the first oil path in order to guide the oil from the oil pump to a heat exchanger; and a first valve inserted, on an upstream side of the heat exchanger, in the second oil path, the first valve configured to open at a first set pressure to conduct the oil from the oil pump to the second oil path, wherein the heat exchanger includes an oil cooler provided on an upstream side thereof and an oil warmer provided on a downstream side thereof, wherein the oil warmer is constructed to draw heat from oil of an other system by exchanging heat with the other system.

* * * * *